UNITED STATES PATENT OFFICE.

LOUIS McMURRAY, OF BALTIMORE, MARYLAND.

IMPROVEMENT IN PROCESSES OF COOKING AND PRESERVING GREEN CORN.

Specification forming part of Letters Patent No. 155,326, dated September 22, 1874; application filed September 18, 1874.

*To all whom it may concern:*

Be it known that I, LOUIS McMURRAY, of the city and county of Baltimore and State of Maryland, have invented a certain new and Improved Process of Cooking and Preserving Green Corn, of which the following is a specification:

It is well known that when green corn, whether cut from the cob or otherwise, is boiled in boiling water, the juices of the corn are diffused into the boiling water, and the steam which passes off in the act of boiling carries with it portions of the essential oils or other properties upon which the flavor of the corn depends. The injurious effects produced by boiling the corn in this way are aggravated when the corn is cooked in an ordinary kettle over a fire, because, in order to prevent the great heat from burning the corn, a very large quantity of water in proportion to the corn must be used, which dissolves out the milk of the corn proportionately, and thus impairs its quality.

For many years, green corn, after having been cut from the cob, has been cooked in hermetically-sealed cans, for the purpose of preventing, by the inclosure of the cans, the loss of aroma that would result from boiling the corn in the open air; and it has been generally supposed that corn could not be cooked in free communication with the open air without injuring its quality, for the reasons above stated.

When green corn is cooked in hermetically-sealed vessels, in its own juices, without adding to it any water, it comes out unequally cooked, having a dark color, and partially dried in some portions of the mass, which is an evil incident to this method of cooking it.

I have discovered how the injurious effects of cooking corn in the open air can be prevented, and at the same time the corn be improved in its quality, so that when cooked it is more succulent than if boiled in the open air, or cooked in its own juices in sealed cans, and is not discolored by the treatment, as it always is when cooked in hermetically-sealed vessels.

The fact upon which this discovery is practically carried out is that the corn can be thoroughly cooked at a temperature slightly below the ordinary boiling-point, and when so cooked no steam can be generated out of the cooked mass, and consequently the incumbent air is not lifted off from the corn, but by its pressure effectually prevents the escape of the aroma of the corn or the fluids in which the cooking is being done; and at the same time an amount of water, either pure or containing other matters in solution, may be added to the corn, and, inasmuch as the temperature is not high enough to drive it off in the form of steam, it can be retained and absorbed, whereby the succulent quality of the corn can be improved, and this quantity of water need not be any greater than is desirable for the purposes described, inasmuch as the heat is not high enough to burn or dry the corn even if no water were added to its natural juices.

I find that it is somewhat advantageous to abstract the water which is contained in the green corn-cobs, and which has in it some of the flavor which is peculiar to corn, and to use it for the purpose of impregnating the corn in the manner suggested. To obtain this juice I crush the cobs in any suitable mill, add water to them, and then express the juice by mechanical pressure in any of the well-known ways for performing analogous operations. The juice is then clarified by boiling and straining, and is ready to be used for the purpose indicated.

The apparatus which I employ to execute my new process is a kettle in which water is kept boiling by any suitable means. Fitting loosely into this kettle is another one of thin metal somewhat smaller, so as to leave space for water between the two, and open to the air, the whole apparatus resembling an ordinary glue-pot in its general construction. The exterior kettle is to be supplied with water enough to fill the space between it and the interior kettle when it is in place, so that the charge of corn will never be in contact with anything but a surface heated with boiling water.

When this apparatus is to be used, the water in the outer kettle is brought to the boiling-point, kernels of green corn cut from the cob are to be placed in the interior kettle, and from one-sixth to one-quarter of their weight of boiling water, either pure or extracted from the green cobs, as described, is to be added to them. The interior kettle is then to be lowered into the exterior one, where it is to be kept for about twenty-five or thirty minutes, the water-bath all the while being kept boiling. From time to time the corn is to be stirred and mixed with the water which has been added to it, and the result will be that the whole of this added water will be absorbed by the kernels, and the corn will be thoroughly cooked and ready for use, and having a very superior quality to that which it would possess if either it were cooked in boiling water in an open vessel or in its own juices in hermetically-sealed ones. The corn is then ready for the table. If it is desired to preserve this it is placed in cans which are hermetically sealed, and it is then subjected to a preserving operation, which is technically called "processing," and which is the same that is used for preserving other cooked substances, whether vegetable or animal, and which is well known.

This process consists in immersing the cans of cooked corn in a bath of salt and water, or of water mingled with suitable chemical ingredients, which will cause the bath to have a considerably higher boiling-point than water. In putting up green corn, however, I much prefer the salt and water bath, which has a boiling-point of 228° Fahrenheit. The bath, when the corn is put in, is not necessarily of any fixed temperature. I prefer that it should be at about 226° Fahrenheit, then gradually elevated to 228° or 230°. When the bath ranges between these temperatures they need remain therein only from two and one-half to three hours. Should the temperature of the bath range between 220° and 222° or 224, the cans require to remain therein about four hours.

In any case no venting is necessary, and the corn is then in condition to keep for a great length of time without discoloration, and with its natural flavor well preserved.

The bath of salt and water is of great value, in that its boiling-point, while of such height as to speedily complete the process, shortening greatly the time heretofore required for the same, still does not exceed the point 228° to 230°, beyond which heat would damage the corn.

The old process of canning uncooked green corn by sealing it in cans without water, and then immersing the cans in boiling water for four hours, or less, whereby the aroma of the corn is sought to be preserved by mechanically inclosing the steam, is quite different from any process which cooks the corn in the open air before it is canned without losing any of its aroma, and without generating steam.

What I claim is—

1. The process herein described of preserving corn, in which it is first cooked in free communication with the open air ready for use at a temperature below the boiling-point, whereby it loses none of its agreeable qualities, and is then hermetically sealed in cans and processed, substantially as described.

2. In the operation of preliminarily cooking the corn at a temperature below the boiling-point, in free communication with the open air, for the purpose of preserving and canning the same, as described, the process of adding water, either pure or extracted from green corn-cobs, to the corn to be cooked, whereby the succulent quality of the corn is improved, substantially as described.

In testimony whereof I have hereunto signed my name this 18th day of September, A. D. 1874.

LOUIS McMURRAY.

Witnesses:
  EWELL A. DICK,
  A. POLLOK.